US010283231B2

(12) United States Patent
Nagamune et al.

(10) Patent No.: US 10,283,231 B2
(45) Date of Patent: May 7, 2019

(54) CONDUCTIVE COMPOSITION

(71) Applicant: ZEON CORPORATION, Tokyo (JP)

(72) Inventors: Tsutomu Nagamune, Tokyo (JP); Masahiro Shigeta, Tokyo (JP); The Ban Hoang, Tokyo (JP); Mitsugu Uejima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/400,886

(22) PCT Filed: May 14, 2013

(86) PCT No.: PCT/JP2013/063403
§ 371 (c)(1),
(2) Date: Nov. 13, 2014

(87) PCT Pub. No.: WO2013/172334
PCT Pub. Date: Nov. 21, 2013

(65) Prior Publication Data
US 2015/0123043 A1    May 7, 2015

(30) Foreign Application Priority Data

May 15, 2012    (JP) .................... 2012-111949

(51) Int. Cl.
*H01B 1/24* (2006.01)
*C01B 32/225* (2017.01)
*C08K 3/04* (2006.01)
*C08K 7/24* (2006.01)
*B82Y 30/00* (2011.01)

(52) U.S. Cl.
CPC ............ *H01B 1/24* (2013.01); *C01B 32/225* (2017.08); *C08K 3/04* (2013.01); *C08K 3/041* (2017.05); *C08K 7/24* (2013.01); *B82Y 30/00* (2013.01); *C08K 2201/001* (2013.01); *C08K 2201/003* (2013.01); *C08K 2201/006* (2013.01); *Y10S 977/742* (2013.01); *Y10S 977/783* (2013.01); *Y10S 977/932* (2013.01)

(58) Field of Classification Search
CPC ........ H01B 1/04; H01B 1/24; C01B 31/0423; C01B 32/225; C08K 3/041; C08K 3/046; C08K 3/04; C08K 7/22; C08K 7/24; C08K 2201/001; C08K 2201/003; C08K 2201/006; Y10S 977/742; Y10S 977/75; Y10S 977/751; Y10S 977/783; Y10S 977/932; C08L 19/00; C08L 21/00
USPC ................. 252/511, 500; 423/448
See application file for complete search history.

(56) References Cited

U.S. PATENT DOCUMENTS

| 6,746,626 | B2* | 6/2004 | Hayward | ............. C08K 3/04 252/500 |
| 7,514,021 | B2* | 4/2009 | Miyagawa | ............. H01B 1/24 252/500 |
| 7,674,402 | B2* | 3/2010 | Iino | ............. H01B 1/24 249/114.1 |
| 7,854,991 | B2* | 12/2010 | Hata | ............. B82Y 30/00 423/445 B |
| 8,124,277 | B2* | 2/2012 | Anada | ............. C09J 123/147 361/502 |
| 2005/0116376 | A1 | 6/2005 | Egami et al. | |
| 2006/0099425 | A1* | 5/2006 | Murakami | ........... C08G 59/686 428/413 |
| 2006/0148966 | A1* | 7/2006 | Drzal | ............. C08K 3/04 524/496 |
| 2008/0280202 | A1* | 11/2008 | Yen | ............. H01B 1/24 429/210 |
| 2008/0318049 | A1 | 12/2008 | Hata et al. | |
| 2009/0011318 | A1* | 1/2009 | Sasaki | ............. B82Y 30/00 429/514 |
| 2010/0062229 | A1 | 3/2010 | Hata et al. | |
| 2010/0129695 | A1* | 5/2010 | Im | ............. H01M 8/0213 429/514 |
| 2011/0008617 | A1 | 1/2011 | Hata et al. | |
| 2011/0117365 | A1 | 5/2011 | Hata et al. | |
| 2011/0281051 | A1* | 11/2011 | Dufaure | ............. C08L 77/06 428/36.9 |
| 2012/0122020 | A1 | 5/2012 | Hata et al. | |

(Continued)

FOREIGN PATENT DOCUMENTS

| JP | S57-123858 A | 8/1982 |
| JP | H06100727 A | 4/1994 |
| JP | 2007-157725 A | 6/2007 |

(Continued)

OTHER PUBLICATIONS

May 4, 2015 Extended Search Report issued in European Application No. 13790914.9.

(Continued)

*Primary Examiner* — Mark Kopec
*Assistant Examiner* — Matthew R Diaz
(74) *Attorney, Agent, or Firm* — Oliff PLC

(57) ABSTRACT

An electrically conductive composition of the present invention contains an expanded graphite, carbon nanotubes, and a polymer compound. An amount of the expanded graphite to be contained is not less than 30 parts by weight and not more than 70 parts by weight with respect to 100 parts by weight of a total amount of the expanded graphite and the polymer compound. An amount of the carbon nanotubes to be contained is not less than 0.5 part by weight and not more than 10 parts by weight with respect to 100 parts by weight of the total amount of the expanded graphite and the polymer compound.

5 Claims, No Drawings

(56) References Cited

U.S. PATENT DOCUMENTS

| | | |
|---|---|---|
| 2013/0037760 A1 | 2/2013 | Maeda et al. |
| 2014/0134520 A1 | 5/2014 | Im et al. |

FOREIGN PATENT DOCUMENTS

| | | | | |
|---|---|---|---|---|
| JP | 2010123564 A | 6/2010 | | |
| JP | 4621896 B2 | 1/2011 | | |
| JP | WO 2011129215 A1 * | 10/2011 | .......... | H01M 8/0213 |
| JP | 2011228059 A | 11/2011 | | |
| JP | 2012-46620 A | 3/2012 | | |
| JP | 2012131855 A | 7/2012 | | |
| JP | 2012221775 A | 11/2012 | | |
| WO | 03078528 A1 | 9/2003 | | |
| WO | 2007116686 A1 | 10/2007 | | |
| WO | 2009/102077 A1 | 8/2009 | | |
| WO | WO 2011147924 A1 * | 12/2011 | ............ | H01M 4/136 |
| WO | WO 2012020099 A1 * | 2/2012 | ............. | C01B 31/04 |

OTHER PUBLICATIONS

Nov. 27, 2014 International Preliminary Report on Patentability issued in International Application No. PCT/JP2013/063403.

Jun. 11, 2013 Search Report issued in International Application No. PCT/JP2013/063403.

\* cited by examiner

CONDUCTIVE COMPOSITION

TECHNICAL FIELD

The present invention relates to an electrically conductive composition.

BACKGROUND ART

A composite material has been studied to which composite material an electrical conductivity is given by mixing an electrically conductive carbon additive such as acetylene black, ketjen black, or carbon nanotubes with a polymer material such resin or rubber.

There is a technique for giving an electrical conductivity to widely-used rubbers such as NBR and SBR.

Patent Literature 1 describes a molded article of an electrically conductive resin for use in a separator of a fuel cell.

Patent Literature 2 describes an electrically conductive resin composition containing graphite fine particles.

Patent Literature 3 describes a thermally conductive pressure-sensitive adhesive composition.

CITATION LIST

Patent Literatures

Patent Literature 1
Pamphlet of International Publication, No. WO03/078528 (Publication Date: Sep. 25, 2003)
Patent Literature 2
Japanese Patent Application Publication, Tokukaihei, No. 6-100727 (1994) (Publication Date: Apr. 12, 1994)
Patent Literature 3
International Publication, No. WO2007/116686 (Publication Date: Oct. 18, 2007)

SUMMARY OF INVENTION

Technical Problem

However, in a case where an electrically conductive carbon additive is mixed with a polymer material so that a resultant mixture has a high electrical conductivity while being flexible like rubber, there are (i) a case where flexibility is impaired due to a large amount of the carbon additive so that the resultant mixture becomes rigid and (ii) a case where it is not possible to mold the resultant mixture.

Further, there is a case where a technique for giving an electrical conductivity to a rubber such as NBR cannot give a sufficient electrical conductivity to a rubber. Such a rubber having an insufficient electrical conductivity cannot be employed as an electrically conductive material.

It cannot be said that electrically conductive resins etc. of Patent Literatures 1 through 3 have a sufficient electrical conductivity.

An object of the present invention is to provide an electrically conductive composition having high flexibility and electrical conductivity.

Solution to Problem

In order to attain the object, an electrically conductive composition of the present invention is configured to be an electrically conductive composition, including: an expanded graphite; carbon nanotubes; and a polymer compound, an amount of the expanded graphite to be contained being not less than 30 parts by weight and not more than 70 parts by weight with respect to 100 parts by weight of a total amount of the expanded graphite and the polymer compound, and an amount of the carbon nanotubes to be contained being not less than 0.5 part by weight and not more than 10 parts by weight with respect to 100 parts by weight of the total amount of the expanded graphite and the polymer compound.

Advantageous Effects of Invention

The present invention brings about an effect of providing an electrically conductive composition having high flexibility and electrical conductivity.

DESCRIPTION OF EMBODIMENTS

<Electrically Conductive Composition>

An electrically conductive composition of the present invention contains an expanded graphite, carbon nanotubes, and a polymer compound. An amount of the expanded graphite to be contained is not less than 30 parts by weight and not more than 70 parts by weight with respect to 100 parts by weight of a total amount of the expanded graphite and the polymer compound. An amount of the carbon nanotubes to be contained is not less than 0.5 part by weight and not more than 10 parts by weight with respect to 100 parts by weight of the total amount of the expanded graphite and the polymer compound.

[Expanded Graphite]

Expanded graphite is obtained by (i) thermally treating expansion graphite (can also be called "expandable graphite") obtained by chemically treating a scale-shaped graphite so that the expansion graphite is expanded, and then (ii) fragmenting the expansion graphite thus expanded.

The expanded graphite can be selected as appropriate from conventionally well-known expanded graphites. A commercially available expanded graphite can also be employed as the expanded graphite. Examples of the commercially available expanded graphite include EC1500, EC1000, EC500, EC300, EC100, and EC50 (all of which are commodity names) manufactured by Ito Graphite Co., Ltd.

An amount of the expanded graphite to be contained in an electrically conductive composition of the present invention needs only to be not less than 30 parts by weight and not more than 70 parts by weight with respect to 100 parts by weight of a total amount of the expanded graphite and the polymer compound. The electrically conductive composition containing the expanded graphite in this amount can have a high electrical conductivity while keeping an excellent flexibility of fluororubber. A more preferable amount of the expanded graphite to be contained is not less than 35 parts by weight and not more than 50 parts by weight.

An average particle diameter of the expanded graphite is not limited to a specific one. It is, however, more preferable that the average particle diameter be, for example, not less than 20 µm and not more than 300 µm. This is because an electrically conductive composition containing an expanded graphite having an average particle diameter within this range has an electrical conductivity higher than that of an electrically conductive composition containing an expanded graphite whose average particle diameter does not fall within the range. Note that an average particle diameter is calculated by (i) defining, as a particle diameter, an effective diameter calculated based on (a) a laser diffraction pattern obtained by actually measuring expanded graphite powder and (b) a theoretical laser diffraction pattern obtained under an assumption that each particle of the expanded graphite powder has a spherical shape, and (ii) measuring a volume-based particle size distribution of a sample. The average particle diameter is measured by, for example, a laser diffraction/scattering particle size distribution measuring device.

The above-described commercially available expanded graphites can be employed as appropriate as the expanded graphite. It is more preferable that the electrically conductive composition of the present invention contain an expanded graphite obtained by the following method. That is, the expanded graphite is obtained by (i) thermally treating an acid-treated graphite at a temperature of not lower than 500° C. and not higher than 1200° C. so as to expand the acid-treated graphite to not smaller than 100 ml/g and not larger than 300 ml/g, and then (ii) crushing the acid-treated graphite thus expanded.

Acid treatment means causing graphite to come in contact with acid. For example, it is more preferable to immerse graphite in acid for not shorter than 10 minutes and not longer than 30 minutes and then collect the graphite. Examples of the acid include sulfuric acid and a mixture of sulfuric acid and hydrogen peroxide.

It is more preferable to thermally treat the acid-treated graphite at a temperature of not lower than 500° C. and not higher than 1200° C. The acid-treated graphite which is thermally treated at the temperature satisfactorily expands to not smaller than 100 ml/g and not larger than 300 ml/g.

The reason why it is preferable to expand the acid-treated graphite to not smaller than 100 ml/g and not larger than 300 ml/g is as follows. The acid-treated graphite which has expanded to not smaller than 100 ml/g gives a low-density expanded graphite. Therefore, by adding the expanded graphite in an amount smaller than expanded graphite powder having lower degree of expansion and an average particle diameter equal to that of the expanded graphite, it is possible to produce a composition having an electrical conductivity equal to that of a composition containing the expanded graphite powder. Further, it is easy to industrially produce an acid-treated graphite having degree of expansion of not larger than 300 ml/g. This is preferable from an economic viewpoint.

Expanded graphite may be crushed by use of a conventionally well-known crusher such as a Henschel mixer, a homomixer, a hand mixer, a hammer mill, a ball mill, a bead mill, or a jet mill. Crushed expanded graphite powder may further be classified by use of a publicly-known method such as an air classifier, a wet centrifuge, or a sieve.

[Carbon Nanotubes]

The carbon nanotubes contained in the electrically conductive composition of the present invention are not particularly limited, and may therefore be conventionally well-known carbon nanotubes. It is, however, more preferable that the carbon nanotubes have an average external diameter of not less than 2 nm and not more than 50 nm so that a higher electrical conductivity is obtained. It is further preferable that the carbon nanotubes be single-walled carbon nanotubes having a BET specific surface area of not smaller than 600 m$^2$/g so that a further higher electrical conductivity is obtained. Note that the average external diameter is obtained by a method described in Examples (later described).

An amount of the carbon nanotubes to be contained in the electrically conductive composition of the present invention is not less than 0.5 part by weight and not more than 10 parts by weight with respect to 100 parts by weight of the total amount of the expanded graphite and the polymer compound. The electrically conductive composition containing the carbon nanotubes in this amount can have a high electrical conductivity.

The carbon nanotubes can be produced by a conventionally well-known method. The single-walled carbon nanotubes having the BET specific surface area of not smaller than 600 m$^2$/g can be easily produced by super-growth method. How to produce carbon nanotubes by the super-growth method is described in, for example Japanese Patent No. 4621896.

Single-walled carbon nanotubes mean a structure in which a plurality of CNTs grow from a base material to be aligned in a specific direction.

It is preferable that the single-walled carbon nanotubes have a specific surface area of not smaller than 600 m$^2$/g. In a case where CNTs are mostly unopened, the single-walled carbon nanotubes preferably have a specific surface area of not less than 600 m$^2$/g. In a case where CNTs are mostly opened, the single-walled carbon nanotubes preferably have a specific surface area of not less than 1300 m$^2$/g. The single-walled carbon nanotubes having the specific surface area of not less than 600 m$^2$/g with the CNTs unopened and the single-walled carbon nanotubes having the specific surface area of not less than 1300 m$^2$/g with the CNTs opened are preferable because it is possible to reduce impurities such as metals or carbon impurities to less than several tens of percent (approximately 40%) of the weight of the single-walled carbon nanotubes.

It is more preferable that the single-walled carbon nanotubes have a weight density which falls within a range from 0.002 g/cm$^3$ to 0.2 g/cm$^3$. The single-walled carbon nanotubes having the weight density of not more than 0.2 g/cm$^3$ are composed of weakly-bonded CNTs. Thanks to the weak bonding, it is easy to uniformly disperse the single-walled carbon nanotubes in a solvent or the like by stirring the single-walled carbon nanotubes in the solvent or the like. That is, it is easy to obtain a homogeneous dispersion solution by using the single-walled carbon nanotubes having the weight density of not more than 0.2 g/cm$^3$. In addition, the single-walled carbon nanotubes having the weight density of not less than 0.002 g/cm$^3$ do not come apart but is well-integrated. It is therefore easy to handle it.

[Polymer Compound]

The polymer compound contained in the electrically conductive composition of the present invention is not limited to a specific one, and may therefore be selected as appropriate according to use of the electrically conductive composition. It is, however, more preferable that the polymer compound be at least one kind of polymer compound selected from the group consisting of thermoplastic resin, rubber, and thermoplastic elastomer. The polymer compound may be a single kind of polymer compound or a mixture of various kinds of polymer compounds.

Examples of the thermoplastic resin include polystyrene, polymethylmethacrylate, polycarbonate, polyethylene, polypropylene, fluororesin, polyvinyl chloride, polyacrylonitrile, polyvinyl alcohol, and polyvinyl acetate.

Examples of the rubber include natural rubber, chloroprene rubber, styrene-butadiene rubber, ethylene-propylene rubber, butyl rubber, acrylonitrile-butadiene rubber, silicon rubber, urethane rubber, fluororubber, halogenated butyl rubber, chlorosulfonated polyethylene rubber, and epichlorohydrin rubber.

Examples of the thermoplastic elastomer include a poly(styrene-butadiene) diblock copolymer, a hydride thereof, a poly(styrene-butadiene-styrene) triblock copolymer, a hydride thereof, a poly(styrene-isoprene) diblock copolymer, a hydride thereof, a poly(styrene-isoprene-styrene) triblock copolymer, and a hydride thereof.

(Method of Producing Electrically Conductive Composition)

The electrically conductive composition of the present invention is produced by, for example, mixing or kneading the polymer compound, the expanded graphite, and the carbon nanotubes so as to be contained in the above-described amounts.

The mixing can be carried out by, for example, either of the following two methods (1) and (2).

Method (1): Dissolve a polymer compound in an organic solvent, disperse carbon nanotubes, mix an expanded graphite, and then remove the organic solvent.

Method (2): Disperse a polymer compound in a solvent which does not dissolve the polymer compound, disperse carbon nanotubes, mix an expanded graphite, and remove the solvent by a solidification method, a casting method, or a direct drying method.

Each of the methods (1) and (2) is specifically carried out as, for example, (a) or (b) below: (a) Put into a container a polymer compound and an organic solvent or a solvent which does not dissolve the polymer compound, mix the polymer compound and the organic solvent or the solvent by, for example, stirring them as appropriate, add carbon nanotubes, disperse the carbon nanotubes in the solvent containing the polymer compound by use of an ultrasonic homogenizer or a wet jet mill, further add an expanded graphite to the solvent, and then mix the expanded graphite with the solvent by stirring; or (b) Disperse carbon nanotubes in a solvent in advance, add a polymer compound to the solvent, mix the carbon nanotubes with the solvent as appropriate so that the polymer compound is dissolved or so that the polymer compound is dispersed, further add an expanded graphite to the solvent, and then mix the expanded graphite with the solvent by stirring. The stirring may be carried out by use of a conventionally well-known stirring device such as a stirring blade, a magnetic stirring device, or a planetary mill. It is more preferable to carry out the stirring for not less than 10 minutes and not more than 24 hours. The solvent is removed by, for example, evaporating the solvent by use of a dryer etc.

The kneading can be carried out by, for example, the following method (3).

Method (3): Knead carbon nanotubes and an expanded graphite with a polymer compound with no use of a solvent. For example, knead a melted resin by use of a device such as a mixer, a uniaxial kneader, a biaxial kneader, a roller, a Brabender, or an extruder.

Among the above methods (1) through (3), the method (1) is more preferably because the method (1) can further improve dispersibility of each of the carbon nanotubes and the expanded graphite.

[Molding]

By mixing a crosslinking agent with the electrically conductive composition of the present invention to generate crosslinking during molding, it is possible to obtain a molded article whose strength is improved. A molding method can be employed according to a shape of a molded article. Examples of the molding method include typical molding methods such as press molding, blow molding, and injection molding.

Preferable examples of the crosslinking agent include crosslinking agents which are generally used to crosslink a polymer compound, such as a peroxide crosslinking agent, a polyol crosslinking agent, a polyamine crosslinking agent, and a thiocyanate crosslinking agent.

A composition of the present invention may contain an antioxidant as appropriate.

Examples of the antioxidant include a phenolic antioxidant, a phosphorous antioxidant, and a sulfur antioxidant. Among these antioxidants, the phenolic antioxidant, particularly an alkyl-substituted phenolic antioxidant is preferable. By mixing these antioxidants, it is possible to prevent strength of and/or electrical conductivity of a composition from being decreased by oxidation, deterioration, etc. during molding.

A conventionally well-known phenolic antioxidant can be employed as the phenolic antioxidant. Examples of the conventionally well-known phenolic antioxidant include: acrylate compounds, such as 2-t-butyl-6-(3-t-butyl-2-hydroxy-5-methylbenzyl)-4-methylphenylacrylate and 2,4-di-t-amyl-6-(1-(3,5-di-t-amyl-2-hydroxyphenyl)ethyl)phenylacrylate, which are described in Japanese Patent Application Publication, Tokukaisho, No. 63-179953 (1988) and Japanese Patent Application Publication, Tokukaihei, No. 1-168643 (1989); alkyl-substituted phenolic compounds such as octadecyl-3-(3,5-di-t-butyl-4-hydroxyphenyl)propionate, 2-2'-methylene-bis(4-methyl-6-t-butylphenol), 1,1,3-tris(2-methy-4-hydroxy-5-t-butylphenyl)butane, 1,3,5-trimethy-2,4,6-tris(3,5-di-t-butyl-4-hydroxybenzyl)benzene, tetrakis(methylene-3-(3',5'-di-t-butyl-4'-hydroxyphenyl propionate) methane, [i.e., pentaerythrimethyl-tetrakis(3-(3,5-di-t-butyl-4-hydroxyphenyl propionate)], and triethylene glycol bis(3-(3-t-butyl-4-hydroxy-5-methyphenyl)propionate); and triazine group-containing phenolic compounds such as 6-(4-hydroxy-3,5-di-t-butylanilino)-2,4-bisoctyl-thio-1,3,5-triazine, and 2 octylthio-4,6-bis-(3,5-di-t-butyl-4-oxyanilino)-1,3,5-triazine.

Examples of the phosphorous antioxidant include: monophosphite compounds such as triphenyl phosphite, diphenyl isodecyl phosphite, phenyl diisodecyl phosphite, tris(nonylphenyl)phosphite, tris(dinonylphenyl)phosphite, tris(2,4-di-t-butylphenyl)phosphite, and 10-(3,5-di-t-butyl-4-hydroxybenzyl)-9,10-dihydro-9-oxa-10-phosphaphenanthrene-10-oxide; and diphosphite compounds such as 4,4'-butylidene-bis(3-methyl-6-t-butylphenyl-di-tridecylphosphite) and 4,4'-isopropylidene-bis(phenyl-di-alkyl(C12 to C15)phosphite). Among these phosphorous antioxidants, the monophosphite compounds are preferable. Among the monophosphite compounds, tris(nonylphenyl)phosphite, tris(dinonylphenyl) phosphite, tris(2,4-di-t-butylphenyl)phosphite, etc. are particularly preferable.

Examples of the sulfur antioxidant include dilauryl 3,3-thiodipropionate, dimyristyl 3,3'-thiodipropionate, distearyl 3,3-thiodipropionate, laurylstearyl 3,3-thiodipropionate, pentaerythritol-tetrakis-(β-lauryl-thio-propionate), and 3,9-bis(2-dodecylthioethyl)-2,4,8,10-tetraoxaspiro[5,5]undecane.

The composition of the present invention may contain one kind of or two or more kinds of these antioxidants. An amount of the antioxidant to be mixed can be determined as appropriate so as not to impair the object of the present invention. The amount of the antioxidant to be mixed falls within, for example, a range from 0.001 part by weight to 5 parts by weight, preferably a range from 0.01 part by weight to 1 part by weight, with respect to 100 parts by weight of an electrically conductive composition.

As has been described, it is more preferable to configure the electrically conductive composition of the present invention so that the carbon nanotubes have an average external diameter of not less than 2 nm and not more than 50 nm.

It is more preferable to configure the electrically conductive composition of the present invention so that the polymer compound is at least one kind of polymer compound selected from the group consisting of thermoplastic resin, rubber, and thermoplastic elastomer.

It is more preferable to configure the electrically conductive composition of the present invention so that the carbon nanotubes are single-walled carbon nanotubes having a BET specific surface area of not smaller than 600 m$^2$/g.

It is more preferable to configure the electrically conductive composition of the present invention so that the expanded graphite is obtained by (i) thermally treating an acid-treated graphite at a temperature of not lower than 500° C. and not higher than 1200° C. so as to expand the acid-treated graphite to not smaller than 100 ml/g and not larger than 300 ml/g and (ii) crushing the acid-treated graphite thus expanded.

EXAMPLES

The following description will discuss Examples and Comparative Examples in order to explain the present invention in more detail. Note that "part" and "%" in Examples and Comparative Examples represent "part by weight" and "weight %", respectively, as long as it is not otherwise specified. Various measurements were carried out as below.

[Determination of whether or not press-molded composition is good]

Whether or not a press-molded composition in each of Examples and Comparative Examples was good was determined as follows.

First, 450 mg of a sample was sandwiched between two thin stainless steel plates subjected to electrolytic polishing to obtain mirror finish, each of which two thin stainless steel plates had a size of 150 mm×150 mm×0.5 mm. The sample sandwiched between the two thin stainless steel plates was placed in a vacuum press molding device (commodity name "IMC-19E4", manufactured by Imoto Machinery Co., Ltd.) Then, the sample was press-molded under vacuum at 120° C. and 0.4 MPa for 5 minutes, so that a thin and circular composition molded article was obtained. A thin and circular molded article which had neither crack nor defect and a thickness of not more than 500 μm was determined to be "good", whereas a molded article which had a thickness of more than 500 μm, had a crack or defect, and/or was not shaped into a target molded article was determined to be "bad".

[Flexibility]

Flexibility of a composition in each of Examples and Comparative Examples was determined as follows. A press-molded composition molded article having a thin and circular shape was cut to be a test piece shaped into a square of 10 mm×10 mm. The test piece was bent by 120° along a diagonal of the test piece. In a case where a test piece thus bent was not broken, the test piece was determined to be "flexible". In contrast, in a case where a test piece thus bent was broken, the test piece was determined to be "inflexible".

[Average External Diameter of Carbon Nanotubes]

An average external diameter of carbon nanotubes used in each of Examples and Comparative Examples was measured as follows.

First, 0.1 mg of carbon nanotubes (CNTs) and 3 mL of ethanol were measured in a 10-mL screw tube bottle on a scale. An ultrasonic cleaner (commodity name "5510J-DTH", manufactured by Branson Ultrasonics Corporation) carried out an ultrasonic treatment with respect to the carbon nanotubes and the ethanol in the screw tube bottle with a vibration output of 180 W at a temperature of 10° C. to 40° C. for 30 minutes, so that the CNTs were uniformly dispersed in the ethanol.

Then, 50 μL of the CNT dispersion solution was dropped on a micro grid (micro grid type A STEM 150 Cu grid, sold by Okenshoji Co., Ltd.) for use in a transmission electron microscope, left as it was for not less than 1 hour, and then dried in vacuum at 25° C. for not less than 5 hours, so that the CNTs were held by the micro grid.

The micro grid was placed on a transmission electron microscope (commodity name "EM-002B", manufactured by TOPCON TECHNOHOUSE CORPORATION). The CNTs on the micro grid were observed at 1.5 million magnifications.

The CNTs were observed at five random places of the micro grid. Ten CNTs were selected at random at each of the five random places, and an external diameter of each of the ten CNTs was measured.

An average value of measured external diameters of 50 CNTs was found as an average external diameter of the CNTs.

[Measurement of BET Specific Surface Area]

A BET specific surface area of the CNTs used in each of Examples and Comparative Examples was measured as follows.

A cell for dedicated use in a BET specific surface area analyzer (commodity name "HM model-1210", manufactured by Mountech Co., Ltd.) was thermally treated at 110° C. for not less than 5 hours to be sufficiently dried. Into the cell was put 20 mg of CNTs measured on a scale.

The cell into which the CNTs were put was placed at a predetermined location of the BET specific surface area analyzer. A BET specific surface area of the CNTs was automatically measured by the BET specific surface area analyzer. Note that the BET specific surface area analyzer measures a specific surface area on a principle that it finds an adsorption and desorption isotherm of liquid nitrogen at 77K and measures the specific surface area from the adsorption and desorption isotherm according to Brunauer-Emmett-Teller method.

[Measurement of Carbon Purity]

A carbon purity of the CNTs used in each of Examples and Comparative Examples was measured as follows.

First, 3 mg of CNTs was measured on a platinum measurement container of a Thermo Gravimetry Differential Thermal Analyzer (commodity name "TG/DTA7000", manufactured by Seiko Instruments Inc.) The platinum measurement container containing the CNTs and an empty platinum measurement container for correction were placed in the Thermo Gravimetry Differential Thermal Analyzer. Under a measurement condition of (i) an air flow of 10 ml, (ii) a temperature range of 50° C. to 800° C., and (iii) a temperature increasing rate of 20° C. per minute, the carbon purity of the CNTs was measured from a weight decrease ratio (%) which was obtained upon completion of measurement in a case where the weight decrease ratio was set to zero at a start of the measurement.

[Measurement of Electrical Conductivity]

An electrical conductivity of a composition in each of Examples and Comparative Examples was measured based on JIS K 7194 by use of a Low Resistivity Meter (commodity name "Lorentz (Registered Trademark)-GP MCP-T610", manufactured by MITSUBISHI CHEMICAL ANALYTECH Co., Ltd.) as below. First, 450 mg of a sample was press-molded under vacuum at 120° C. and 0.4 PMa for 5 minutes so as to be a molded article having a thin and circular shape, a surface area of approximately 40 mmφ to 60 mmφ, and a thickness of 100 μm to 500 μm. The molded article was cut to be four test pieces each shaped into a square of 10 mm×10 mm. The four test pieces were employed as a measurement sample. A PSP probe was selected as a four-point probe of the Lorentz GP. The measurement sample was fixed onto an insulating board, the PSP probe was put to a center position (a position of 5 mm in a longitudinal direction and 5 mm in a traverse direction) of the measurement sample, and then 10 V was applied to the measurement sample to measure an electrical conductivity of the measurement sample. An average value of measured electrical conductivities of the four measurement samples was found as an electrical conductivity of the sample.

Example 1

Five grams of a fluororubber (commodity name "KYNAR FLEX (Registered Trademark) 2500", manufactured by ARKEMA) was added to 95 g of 4-methyl-2-pentanone. A mixture thereof was stirred at 25° C. for not less than 24 hours, so that 100 g of a 5% fluororubber solution was prepared.

Then, 5 g of the 5% fluororubber solution and 15 mg of single-walled carbon nanotubes (SWCNTs-1) (single-walled carbon nanotubes produced by a method described in Example 1 of Japanese Patent No. 4621896) were put into a 20-cc screw tube bottle, and stirred at 25° C. for not less than 1 hour, so that the CNTs were dispersed in advance.

Note that the SWCNTs-1 had an average external diameter of 3.0 nm, a BET specific surface area of 1020 $m^2/g$, and a carbon purity of 99.9%.

Then, an ultrasonic treatment was carried out with respect to the SWCNTs-1 and the 5% fluororubber solution in the screw tube bottle with a vibration output of 180 W at a temperature of 10° C. to 40° C. for 1 hour by using the ultrasonic cleaner (commodity name "5510J-DTH", manufactured by Branson Ultrasonics Corporation), so that the SWCNTs-1 were dispersed in the 5% fluororubber solution.

The screw tube bottle containing the SWCNTs-1 dispersed in the 5% fluororubber solution was taken out from the ultrasonic cleaner. A stirring bar was put into the screw tube bottle. While the SWCNTs-1 dispersed in the 5% fluororubber solution were being stirred in the screw tube bottle at 25° C. by the stirring bar, 250 mg of an expanded graphite (commodity name "EC500", manufactured by Ito Graphite Co., Ltd.) having an average particle diameter of 25 μm was gradually added into the screw tube bottle. After addition of the expanded graphite, a mixture thereof was further continuously stirred for not less than 1 hour, so that a mixture solution of the expanded graphite, the SWCNTs-1, and the fluororubber was prepared.

Then, n-hexane having an amount 10 times as large as that of the mixture solution of the expanded graphite, the SWCNTs-1 and the fluororubber, and a stirring bar were put into a 200-cc beaker, and the n-hexane in a stirred state was prepared. The mixture solution of the expanded graphite, the SWCNTs-1 and the fluororubber was then gradually added to the n-hexane, so that the mixture solution was coagulated in the n-hexane to give a composition of the expanded graphite, the SWCNTs-1, and the fluororubber in a shape of crumbs.

Then, the composition was taken out from the n-hexane by means of suction filtration, and dried under vacuum at 40° C. for not less than 24 hours in a vacuum dryer. Consequently obtained was 506 mg of a composition of 50 parts of the expanded graphite, 3 parts of the SWCNTs-1, and 50 parts of the fluororubber.

The composition of 50 parts of the expanded graphite, 3 parts of the SWCNTs-1, and 50 parts of the fluororubber was molded to be a molded article having a thin and disk-like shape. It was found that the molded article was a flexible rubber-like material and had an electrical conductivity of 58.8 S/cm.

Example 2

Example 2 was identical to Example 1 except that Example 2 used 25 mg of the single-walled carbon nanotubes (SWCNTs-1). Obtained was 512 mg of a composition of 50 parts of the expanded graphite, 5 parts of the SWCNTs-1, and 50 parts of the fluororubber.

The composition was molded to be a molded article having a thin and disk-like shape. It was found that the molded article was a flexible rubber-like material and had an electrical conductivity of 65.7 S/cm.

Example 3

Example 3 was identical to Example 1 except that Example 3 used 5 mg of the single-walled carbon nanotubes (SWCNTs-1). Obtained was 500 mg of a composition of 50 parts of the expanded graphite, 1 part of the SWCNTs-1, and 50 parts of the fluororubber.

The composition was molded to be a molded article having a thin and disk-like shape. It was found that the molded article was a flexible rubber-like material and had an electrical conductivity of 43.6 S/cm.

Example 4

Example 4 was identical to Example 1 except that Example 4 used 50 mg of the single-walled carbon nanotubes (SWCNTs-1). Obtained was 500 mg of a composition of 50 parts of the expanded graphite, 10 parts of the SWCNTs-1, and 50 parts of the fluororubber.

The composition was molded to be a molded article having a thin and disk-like shape. It was found that the molded article was a flexible rubber-like material and had an electrical conductivity of 102.1 S/cm.

Example 5

Example 5 was identical to Example 1 except that Example 5 used 15 mg of multiwall carbon nanotubes (MWCNTs-1) (commodity name "NC7000", manufactured by Nanocyl) instead of the SWCNTs-1. Obtained was 502 mg of a composition of 50 parts of the expanded graphite, 3 parts of the MWCNTs-1, and 50 parts of the fluororubber.

Note that the MWCNTs-1 had an average external diameter of 7.5 nm (published value in a catalog where the commodity appears: 5 nm to 10 nm), a BET specific surface area of 300 $m^2/g$, and a carbon purity of 96.8%.

The composition was molded to be a molded article having a thin and disk-like shape. It was found that the molded article was a flexible rubber-like material and had an electrical conductivity of 47.9 S/cm.

Example 6

Example 6 was identical to Example 1 except that Example 6 used 15 mg of multiwall carbon nanotubes (MWCNTs-2) (commodity name "CTube 100", manufactured by CNT. Co., Ltd.) instead of the SWCNTs-1. Obtained was 509 mg of a composition of 50 parts of the expanded graphite, 3 parts of the MWCNTs-2, and 50 parts of the fluororubber.

Note that the MWCNTs-2 had an average external diameter of 23 nm (published value in a catalog where the commodity appears: 10 nm to 50 nm), a BET specific surface area of 330 m$^2$/g, and a carbon purity of 95.5%.

The composition was molded to be a molded article having a thin and disk-like shape. It was found that the molded article was a flexible rubber-like material and had an electrical conductivity of 43.1 S/cm.

Example 7

Example 7 was identical to Example 1 except that Example 7 used 250 mg of an expanded graphite (commodity name "EC50", manufactured by Ito Graphite Co., Ltd.) having an average particle diameter of 250 μm instead of the expanded graphite having the average particle diameter of 25 μm. Obtained was 508 mg of a composition of 50 parts of the expanded graphite, 3 parts of the SWCNTs-1, and 50 parts of the fluororubber.

The composition was molded to be a molded article having a thin and disk-like shape. It was found that the molded article was a flexible rubber-like material and had an electrical conductivity of 55.0 S/cm.

Example 8

Example 8 was identical to Example 1 except that Example 8 used 250 mg of an expanded graphite (commodity name "EC1500", manufactured by Ito Graphite Co., Ltd.) having an average particle diameter of 7 μm instead of the expanded graphite having the average particle diameter of 25 μm. Obtained was 510 mg of a composition of 50 parts of the expanded graphite, 3 parts of the SWCNTs-1, and 50 parts of the fluororubber.

The composition was molded to be a molded article having a thin and disk-like shape. It was found that the molded article was a flexible rubber-like material and had an electrical conductivity of 45.7 S/cm.

Example 91

Example 9 was identical to Example 1 except that Example 9 used (i) 150 mg of the expanded graphite having the average particle diameter of 25 μm, (ii) 7.0 g of the 5% fluororubber solution, and (iii) 25 mg of the single-walled carbon nanotubes (SWCNTs-1). Obtained was 501 mg of a composition of 30 parts of the expanded graphite, 5 parts of the SWCNTs-1, and 70 parts of the fluororubber.

The composition was molded to be a molded article having a thin and disk-like shape. It was found that the molded article was a flexible rubber-like material and had an electrical conductivity of 41.9 S/cm.

Example 10

Example 10 was identical to Example 1 except that Example 10 used (i) 350 mg of the expanded graphite having the average particle diameter of 25 μm, and (ii) 3 g of the 5% fluororubber solution. Obtained was 499 mg of a composition of 70 parts of the expanded graphite, 3 parts of the SWCNTs-1, and 30 parts of the fluororubber.

The composition was molded to be a molded article having a thin and disk-like shape. It was found that the molded article was a flexible rubber-like material and had an electrical conductivity of 100.0 S/cm.

Example 11

Example 11 was identical to Example 1 except that Example 11 used 15 mg of single-walled carbon nanotubes (SWCNTs-2) (commodity name "HiPco SuperPure", manufactured by NanoIntegris Inc.) instead of the SWCNTs-1. Obtained was 489 mg of a composition of 50 parts of the expanded graphite, 3 parts of the SWCNTs-2, and 50 parts of the fluororubber.

Note that the SWCNTs-2 had an average external diameter of 1.0 nm (published value in a catalog where the commodity appears: 0.8 nm to 1.2 nm), a BET specific surface area of 450 m$^2$/g, and a carbon purity of 99.1%.

The composition was molded to be a molded article having a thin and disk-like shape. It was found that the molded article was a flexible rubber-like material and had an electrical conductivity of 33.6 S/cm.

Comparative Example 1

Five grams of the fluororubber (commodity name "KYNAR FLEX (Registered Trademark) 2500", manufactured by ARKEMA) was added to 95 g of 4-methyl-2-pentanone. A mixture thereof was stirred at 25° C. for not less than 24 hours, so that 100 g of a 5% fluororubber solution was prepared. Five grams of the 5% fluororubber solution was put into a 20-cc screw tube bottle.

A stirring bar was put into the screw tube bottle containing the 5% fluororubber solution. While the 5% fluororubber solution was being stirred in the screw tube bottle at 25° C. by the stirring bar, 250 mg of the expanded graphite (commodity name "EC500", manufactured by Ito Graphite Co., Ltd.) having the average particle diameter of 25 μm was gradually added into the screw tube bottle. After addition of the expanded graphite, a mixture thereof was further continuously stirred for not less than 1 hour, so that a mixture solution of the expanded graphite and the fluororubber was prepared.

Then, n-hexane having an amount 10 times as large as that of the mixture solution of the expanded graphite and the fluororubber, and a stirring bar were put into a 200-cc beaker, and the n-hexane in a stirred sate was prepared. The mixture solution of the expanded graphite and the fluororubber was then gradually added to the n-hexane, so that the mixture solution was coagulated in the n-hexane to give a composition of the expanded graphite and the fluororubber in a shape of crumbs.

Then, the composition was taken out from the n-hexane by means of suction filtration, and dried under vacuum at 40° C. for not less than 24 hours in a vacuum dryer. Consequently obtained was 486 mg of a composition of 50 parts of the expanded graphite and 50 parts of the fluororubber.

The composition of 50 parts of the expanded graphite and 50 parts of the fluororubber was molded to be a molded article having a thin and disk-like shape. It was found that the molded article was a flexible rubber-like material and had an electrical conductivity of 31.5 S/cm.

Comparative Example 2

Comparative Example 2 was identical to Comparative Example 1 except that Comparative Example 2 used 250 mg of the expanded graphite (commodity name "EC50", manufactured by Ito Graphite Co., Ltd.) having the average particle diameter of 250 µm instead of the expanded graphite having the average particle diameter of 25 µm. Obtained was 489 mg of a composition of 50 parts of the expanded graphite and 50 parts of the fluororubber.

The composition was molded to be a molded article having a thin and disk-like shape. It was found that the molded article was a flexible rubber-like material and had an electrical conductivity of 15.0 S/cm.

Comparative Example 3

Comparative Example 3 was identical to Comparative Example 1 except that Comparative Example 3 used 250 mg of the expanded graphite (commodity name "EC1500", manufactured by Ito Graphite Co., Ltd.) having the average particle diameter of 7 µm instead of the expanded graphite having the average particle diameter of 25 µm. Obtained was 488 mg of a composition of 50 parts of the expanded graphite and 50 parts of the fluororubber.

The composition was molded to be a molded article having a thin and disk-like shape. It was found that the molded article was a flexible rubber-like material and had an electrical conductivity of 16.5 S/cm.

Comparative Example 4

Five grams of the fluororubber (commodity name "KYNAR FLEX (Registered Trademark) 2500", manufactured by ARKEMA) was added to 95 g of 4-methyl-2-pentanone. A mixture thereof was stirred at 25° C. for not less than 24 hours, so that 100 g of a 5% fluororubber solution was prepared.

Then, 10 g of the 5% fluororubber solution and 15 mg of the single-walled carbon nanotubes (SWCNTs-1) were put into a 20-cc screw tube bottle, and stirred at 25° C. for not less than 1 hour, so that the SWCNTs-1 were dispersed in advance.

An ultrasonic treatment was carried out with respect to the SWCNTs-1 and the 5% fluororubber solution in the screw tube bottle with a vibration output of 180 W at a temperature of 10° C. to 40° C. for 1 hour by using the ultrasonic cleaner (commodity name "5510J-DTH", manufactured by Branson Ultrasonics Corporation), so that the SWCNTs-1 were dispersed in the 5% fluororubber solution. This prepared a mixture solution of the SWCNTs-1 and the fluororubber.

Then, n-hexane having an amount 10 times as large as that of the mixture solution of the SWCNTs-1 and the fluororubber, and a stirring bar were put into a 200-cc beaker, and the n-hexane in a stirred state was prepared. The mixture solution of the SWCNTs-1 and the fluororubber was then gradually added to the n-hexane, so that the mixture solution was coagulated in the n-hexane to give a composition of the SWCNTs-1 and the fluororubber in a shape of crumbs.

Then, the composition was taken out from the n-hexane by means of suction filtration, and dried under vacuum at 40° C. for not less than 24 hours in a vacuum dryer. Consequently obtained was 499 mg of a composition of 3 parts of the SWCNTs-1 and 100 parts of the fluororubber.

The composition of 3 parts of the SWCNTs-1 and 100 parts of the fluororubber was molded to be a molded article having a thin and disk-like shape. It was found that the molded article was a flexible rubber-like material and had an electrical conductivity of 7.5 S/cm.

Comparative Example 5

Comparative Example 5 was identical to Comparative Example 4 except that Comparative Example 5 used 50 mg of the single-walled carbon nanotubes (SWCNTs-1). Obtained was 522 mg of a composition of 10 parts of the SWCNTs-1 and 100 parts of the fluororubber.

The composition was molded to be a molded article having a thin and disk-like shape. It was found that the molded article was a flexible rubber-like material and had an electrical conductivity of 28.6 S/cm.

Comparative Example 6

Comparative Example 6 was identical to Example 1 except that Comparative Example 6 used 250 mg of a spherical graphite (commodity name "SG-BH", manufactured by Ito Graphite Co., Ltd.) having an average particle diameter of 20 µm instead of the expanded graphite having the average particle diameter of 25 µm. Obtained was 495 mg of a composition of 50 parts of spherical graphite, 3 parts of the SWCNTs-1, and 50 parts of the fluororubber.

The composition was molded to be a molded article having a thin and disk-like shape. It was found that the molded article was a flexible rubber-like material and had an electrical conductivity of 8.1 S/cm.

Comparative Example 7

Comparative Example 7 was identical to Example 1 except that Comparative Example 7 used 250 mg of ketjen black (commodity name "carbon ECP600JD", manufactured by Lion Corporation) instead of the expanded graphite having the average particle diameter of 25 µm. Obtained was 498 mg of a composition of 50 parts of the ketjen black, 3 parts of the SWCNTs-1, and 50 parts of the fluororubber.

The composition was so rigid that it was difficult to mold the composition by means of vacuum pressing, thereby failing to obtain a thin molded article. It was not possible to measure an electric conductivity of the composition.

Comparative Example 8

Comparative Example 8 was identical to Example 8 except that Comparative Example 8 used 80 mg of the ketjen black (commodity name "carbon ECP600JD", manufactured by Lion Corporation) instead of the expanded graphite having the average particle diameter of 25 µm. Obtained was 485 mg of a composition of 16 parts of the ketjen black, 3 parts of the SWCNTs-1, and 84 parts of the fluororubber.

The composition was molded to be a molded article having a thin and disk-like shape. Though the molded article was a flexible rubber-like material, the ketjen black bled on a surface of the molded article so that a hand got black when the surface was touched with the hand. The molded article had an electrical conductivity of 8.0 S/cm.

Comparative Example 9

Comparative Example 9 was identical to Example 1 except that Comparative Example 9 used 15 mg of the ketjen black (commodity name "carbon ECP600JD", manufactured by Lion Corporation) instead of the SWCNTs-1. Obtained was 499 mg of a composition of 50 parts of the expanded graphite, 3 parts of the ketjen black, and 50 parts of the fluororubber.

The composition was molded to be a molded article having a thin and disk-like shape. It was found that the molded article was a flexible rubber-like material and had an electrical conductivity of 32.0 S/cm.

Comparative Example 10

Comparative Example 10 was identical to Example 1 except that Comparative Example 10 used (i) 50 mg of the expanded graphite having the average particle diameter of 25 μm, and (ii) 9.0 g of the 5% fluororubber solution. Obtained was 486 mg of a composition of 10 parts of the expanded graphite, 3 parts of the SWCNTs-1, and 90 parts of the fluororubber.

The composition was molded to be a molded article having a thin and disk-like shape. It was found that the molded article was a flexible rubber-like material and had an electrical conductivity of 8.0 S/cm.

Comparative Example 11

Comparative Example 11 was identical to Example 1 except that Comparative Example 11 used (i) 400 mg of the expanded graphite having the average particle diameter of 25 μm, and (ii) 2 g of the 5% fluororubber solution. Obtained was 499 mg of a composition of 80 parts of the expanded graphite, 3 parts of the SWCNTs-1, and 20 parts of the fluororubber.

It was possible to mold the composition to be a molded article. However, the molded article had no dynamic resistance, and was easily broken by being bent or tensioned. It was not possible to measure an electrical conductivity of the molded article.

Tables 1 through 4 below list results of Examples and Comparative Examples.

TABLE 1

|  |  | Explanatory Note | Example 1 | Example 2 | Example 3 |
|---|---|---|---|---|---|
| Polymer Material | KYNAR FLEX (Registered Trademark) 2500 | Fluororubber | 50 | 50 | 50 |
| Carbon Additive | EC500 | Expanded Graphite APD: 25 μm | 50 | 50 | 50 |
|  | EC1500 | Expanded Graphite APD: 7 μm |  |  |  |
|  | EC50 | Expanded Graphite APD: 250 μm |  |  |  |
|  | SG-BH | Spherical Graphite APD: 20 μm |  |  |  |
|  | Carbon ECP600JD | Ketjen Black |  |  |  |
| Carbon Nanotubes (Note that numeric value in parentheses represents published APD in catalog (nm)) | SWCNTs-1 | 3.0 nm, 1020 m$^2$/g, CP: 99.9% | 3 | 5 | 1 |
|  | SWCNTs-2 | 1.0 nm (0.8 to 1.2 nm), 450 m$^2$/g, CP: 99.1% |  |  |  |
|  | MWCNTs-1 | 7.5 nm (5 to 10 nm), 300 m$^2$/g, CP: 96.8% |  |  |  |
|  | MWCNTs-2 | 23 nm (10 to 50 nm), 330 m$^2$/g, CP: 95.5% |  |  |  |
| Result | Whether or not pressed-molded article is good |  | Good | Good | Good |
|  | Flexibility |  | Flexible | Flexible | Flexible |
|  | Electrical Conductivity (S/cm) |  | 58.5 | 65.7 | 43.6 |

"APD" stands for Average Particle Diameter.
"CP" stands for Carbon Purity.

TABLE 2

|  |  | Example 4 | Example 5 | Example 6 | Example 7 | Example 8 | Example 9 | Example 10 | Example 11 |
|---|---|---|---|---|---|---|---|---|---|
| Polymer Material | KYNAR FLEX (Registered Trademark) 2500 | 50 | 50 | 50 | 50 | 50 | 70 | 30 | 50 |
| Carbon Additive | EC500 | 50 | 50 | 50 |  |  |  | 30 | 70 | 50 |
|  | EC1500 |  |  |  |  | 50 |  |  |  |
|  | EC50 |  |  |  | 50 |  |  |  |  |
|  | SG-BH |  |  |  |  |  |  |  |  |
|  | Carbon ECP600JD |  |  |  |  |  |  |  |  |
| Carbon Nanotubes | SWCNTs-1 | 10 |  |  | 3 | 3 | 5 | 3 |  |
|  | SWCNTs-2 |  |  |  |  |  |  |  | 3 |
|  | MWCNTs-1 |  | 3 |  |  |  |  |  |  |
|  | MWCNTs-2 |  |  | 3 |  |  |  |  |  |

TABLE 2-continued

|  |  | Example 4 | Example 5 | Example 6 | Example 7 | Example 8 | Example 9 | Example 10 | Example 11 |
|---|---|---|---|---|---|---|---|---|---|
| Result | Whether or not pressed-molded article is good | Good | Good | Good | Good | Good | Good | Good | Good |
|  | Flexibility | Flexible | Flexible | Flexible | Flexible | Flexible | Flexible | Flexible | Flexible |
|  | Electrical Conductivity (S/cm) | 102.1 | 47.9 | 43.1 | 55.0 | 45.7 | 41.9 | 100.0 | 33.6 |

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Polymer Material | KYNAR FLEX (Registered Trademark) 2500 | 50 | 50 | 50 | 100 | 100 | 50 | 50 |
| Carbon Additive | EC500 | 50 |  |  |  |  |  |  |
|  | EC1500 |  |  | 50 |  |  |  |  |
|  | EC50 |  | 50 |  |  |  |  |  |
|  | SG-BH |  |  |  |  |  | 50 |  |
|  | Carbon ECP600JD |  |  |  |  |  |  | 50 |
| Carbon Nanotubes | SWCNTs-1 |  |  |  | 3 | 10 | 3 | 3 |
|  | SWCNTs-2 |  |  |  |  |  |  |  |
|  | MWCNTs-1 |  |  |  |  |  |  |  |
|  | MWCNTs-2 |  |  |  |  |  |  |  |
| Result | Whether or not pressed-molded article is good | Good | Good | Good | Good | Good | Good | Bad |
|  | Flexibility | Flexible | Flexible | Flexible | Flexible | Flexible | Flexible | — |
|  | Electrical Conductivity (S/cm) | 31.5 | 15.0 | 16.5 | 7.5 | 28.6 | 8.1 | — |

TABLE 4

|  |  | Comp. Ex. 8 | Comp. Ex. 9 | Comp. Ex. 10 | Comp. Ex. 11 |
|---|---|---|---|---|---|
| Polymer Material | KYNAR FLEX (Registered Trademark) 2500 | 84 | 50 | 90 | 20 |
| Carbon Additive | EC500 |  |  | 50 | 10 |
|  | EC1500 |  |  |  |  |
|  | EC50 |  |  |  |  |
|  | SG-BH |  |  |  |  |
|  | Carbon ECP600JD | 16 | 3 |  | 80 |
| Carbon Nanotubes | SWCNTs-1 | 3 |  | 3 | 3 |
|  | SWCNTs-2 |  |  |  |  |
|  | MWCNTs-1 |  |  |  |  |
|  | MWCNTs-2 |  |  |  |  |
| Result | Whether or not pressed-molded article is good | Good (*Note) | Good | Good | Good |
|  | Flexibility | Flexible | Flexible | Flexible | Inflexible |
|  | Electrical Conductivity (S/cm) | 8.0 | 32.0 | 8.0 | — |

(*Note):
Ketjen black bled on surface of molded article.

As is clear from the results of Examples 1 through 8 and Comparative Examples 1 through 5, the electrically conductive composition of the present invention showed a specially high electrical conductivity unpredictable from an electrical conductivity of a composition containing only an expanded graphite or CNTs, and a polymer compound. That is, the electrically conductive composition of the present invention had a remarkably high electrical conductivity of not less than 40 S/cm while keeping properties necessary for a composition, i.e., flexibility, moldability, and non-bleed out property (uncontamination property).

As is clear from the results of Examples 10 and 11 and Comparative Examples 10 and 11, of a composition containing an expanded graphite which did not fall within a range of not less than 30 parts by weight and not more than 70 parts by weight with respect to 100 parts by weight of a total amount of the expanded graphite and a polymer compound, a composition containing less than 30 parts by weight of the expanded graphite did not have such a remarkably high electrical conductivity of not less than 40 S/cm, and a composition containing more than 70 parts by weight of the expanded graphite remarkably reduced a dynamical strength of a composition molded article. It was found that these compositions were not preferable.

As is clear from the result of Example 11, a composition containing carbon nanotubes whose average external diameter did not fall within a range of not less than 2.0 nm and not more than 50 nm did not have an electrical conductivity as shown in Examples 1 through 10. It was found that carbon nanotubes having an average external diameter of not less than 2.0 nm and not more than 50 nm were more preferable.

As is clear from the results of Comparative Examples through 8, a composition containing another kind of graphite or an electrically conductive carbon instead of an expanded graphite did not have (i) an improved electrical conductivity as shown in Examples and/or (ii) at least one of properties necessary for a composition, i.e., moldability, flexibility, and non-bleed out property (uncontamination property). It is found that the expanded graphite is suitably selected.

As is clear from the result of Comparative Example 9, a composition containing an electrically conductive carbon additive instead of carbon nanotubes did not have an electrical conductivity as shown in Examples. It was found that the composition was not preferable.

As is clear from the results of Examples 1, 5 and 6, a composition containing carbon nanotubes having not only an average external diameter of not less than 2 nm and not more than 50 nm but also a BET specific surface area of not less than 600 m$^2$/g had a higher electrical conductivity. It was found that carbon nanotubes having a BET specific surface area of not less than 800 m$^2$/g were more preferable.

As is clear from the results of Examples 1, 7 and 8, though an effect of addition of carbon nanotubes was brought about regardless of an average particle diameter of an expanded graphite, a composition containing an expanded graphite having an average particle diameter smaller than 10 μm tended to reduce an electrical conductivity of the composition itself. It was found that it was more preferable that an average particle diameter of expanded graphite powder fell within a range of 10 μm to 300 μm.

INDUSTRIAL APPLICABILITY

The present invention is applicable to various fields where electrically conductive materials are utilized.

The invention claimed is:
1. An electrically conductive composition, comprising:
an expanded graphite;
carbon nanotubes; and
one or more of a fluororubber and a silicon rubber,
   wherein apart from the one or more of the fluororubber and the silicon rubber, no other polymer compounds are present in the electrically conductive composition,
the expanded graphite has an average particle diameter of not less than 20 μm and not more than 300 μm,
the expanded graphite is contained in the electrically conductive composition in an amount not less than 50 parts by weight and not more than 70 parts by weight with respect to 100 parts by weight of a total amount of the expanded graphite and the one or more of the fluororubber and the silicon rubber, and
the carbon nanotubes is contained in the electrically conductive composition in an amount not less than 0.5 part by weight and not more than 10 parts by weight with respect to 100 parts by weight of the total amount of the expanded graphite and the one or more of the fluororubber and the silicon rubber.

2. The electrically conductive composition as set forth in claim 1, wherein the carbon nanotubes have an average external diameter of not less than 2 nm and not more than 50 nm.

3. The electrically conductive composition as set forth in claim 1, wherein the carbon nanotubes are single-walled carbon nanotubes having a BET specific surface area of not smaller than 600 m$^2$/g and not greater than 1020 m$^2$/g.

4. The electrically conductive composition as set forth in claim 1, wherein the expanded graphite is obtained by (i) thermally treating an acid-treated graphite at a temperature of not lower than 500° C. and not higher than 1200° C. so as to expand the acid-treated graphite to not smaller than 100 ml/g and not larger than 300 ml/g and (ii) crushing the acid-treated graphite thus expanded.

5. An electrically conductive composition, comprising:
an expanded graphite;
carbon nanotubes; and
a fluororubber; wherein
   apart from the fluororubber, no other polymer compounds are present in the electrically conductive composition,
the expanded graphite has an average particle diameter of not less than 20 μm and not more than 300 μm,
the expanded graphite is contained in the electrically conductive composition in an amount not less than 50 parts by weight and not more than 70 parts by weight with respect to 100 parts by weight of a total amount of the expanded graphite and the fluororubber, and
the carbon nanotubes is contained in the electrically conductive composition in an amount not less than 0.5 part by weight and not more than 10 parts by weight with respect to 100 parts by weight of the total amount of the expanded graphite and the fluororubber.

* * * * *